United States Patent
Douglas et al.

(10) Patent No.: US 9,225,151 B2
(45) Date of Patent: Dec. 29, 2015

(54) SPARK PLUG FOR REMOVING RESIDUAL EXHAUST GAS AND ASSOCIATED COMBUSTION CHAMBER

(71) Applicant: CUMMINS IP, INC, Minneapolis, MN (US)

(72) Inventors: Keith J. Douglas, Daventry (GB); Xiao Qin, Columbus, IN (US); Daniel J. O'Connor, Columbus, IN (US); Premjee Sasidharan, Columbus, IN (US)

(73) Assignee: CUMMINS IP, INC., Columbus, IN (US)

( * ) Notice: Subject to any disclaimer, the term of this patent is extended or adjusted under 35 U.S.C. 154(b) by 329 days.

(21) Appl. No.: 13/708,690

(22) Filed: Dec. 7, 2012

(65) Prior Publication Data

US 2013/0206101 A1    Aug. 15, 2013

Related U.S. Application Data

(60) Provisional application No. 61/597,155, filed on Feb. 9, 2012.

(51) Int. Cl.
*H01T 13/32* (2006.01)
*H01T 13/20* (2006.01)
(Continued)

(52) U.S. Cl.
CPC ............... *H01T 13/46* (2013.01); *F02B 19/12* (2013.01); *H01T 13/32* (2013.01); *H01T 13/467* (2013.01); *Y02T 10/125* (2013.01)

(58) Field of Classification Search
CPC ......... H01L 13/24; H01L 13/32; H01L 13/46; H01L 13/467

USPC ................................................... 313/139–143
See application file for complete search history.

(56) References Cited

U.S. PATENT DOCUMENTS

| | | | |
|---|---|---|---|
| 983,737 A | * | 2/1911 | Maher ........................... 313/138 |
| 1,253,570 A | * | 1/1918 | Berry ............................ 313/139 |
| 1,312,317 A |   | 8/1919 | Gerken |

(Continued)

FOREIGN PATENT DOCUMENTS

| EP | 1701419 A1 | 9/2006 |
|---|---|---|
| EP | 2 053 711 | 4/2009 |

(Continued)

OTHER PUBLICATIONS

PCT/US2013/025611 International Search Report and Written Opinion mailed Jun. 2, 2013.

*Primary Examiner* — Mariceli Santiago
(74) *Attorney, Agent, or Firm* — Foley & Lardner LLP

(57) ABSTRACT

A spark plug, and associated systems, for an internal combustion engine includes a central electrode that terminates at a first distal end surface defined about a central axis. The spark plug also includes at least one outer electrode that terminates at a second distal end surface. The at least one outer electrode at least partially laterally surrounds the central electrode such that the second distal end surface is radially offset relative to the central electrode and a lateral gap is defined between the central electrode and the at least one outer electrode. The spark plug include features that force or redirect movement of the flow of the fresh air-fuel mixture through the lateral gap to help to purge or move the residual exhaust gases left over from a previous combustion event out of the lateral gap.

20 Claims, 7 Drawing Sheets

(51) Int. Cl.
*H01T 13/46* (2006.01)
*F02B 19/12* (2006.01)

(56) References Cited

U.S. PATENT DOCUMENTS

| | | | |
|---|---|---|---|
| 1,943,674 A * | 1/1934 | Woods-Humphery et al. | 313/140 |
| 1,952,343 A * | 3/1934 | Watts | 313/140 |
| 3,958,144 A * | 5/1976 | Franks | 313/138 |
| 4,901,688 A * | 2/1990 | Kashiwara et al. | 123/169 EL |
| 5,007,389 A * | 4/1991 | Kashiwara et al. | 313/139 |
| 5,051,651 A * | 9/1991 | Kashiwara et al. | 313/139 |
| 5,969,466 A * | 10/1999 | Dibianca | 313/139 |
| 6,095,124 A | 8/2000 | Matsubara et al. | |
| 6,583,539 B1 | 6/2003 | Zamora | |
| 6,676,468 B2 * | 1/2004 | Ishiguro et al. | 445/7 |
| 7,178,513 B2 | 2/2007 | Ward | |
| 7,714,488 B2 | 5/2010 | Nagasawa et al. | |
| 7,721,702 B2 | 5/2010 | Miller et al. | |
| 2009/0066511 A1 * | 3/2009 | Okazaki | 340/572.1 |
| 2009/0096344 A1 * | 4/2009 | Steigleman et al. | 313/139 |
| 2010/0133976 A1 * | 6/2010 | Siegel | 313/141 |

FOREIGN PATENT DOCUMENTS

| | | | |
|---|---|---|---|
| JP | 4196080 | 7/1992 | |
| JP | 07288170 | 10/1995 | |
| JP | 2008-108448 | 5/2008 | |
| JP | 2011119077 A | 6/2011 | |
| WO | WO 9701028 A1 * | 1/1997 | H01T 13/14 |
| WO | 2011031449 A2 | 3/2011 | |

* cited by examiner

SPARK PLUG FOR REMOVING RESIDUAL EXHAUST GAS AND ASSOCIATED COMBUSTION CHAMBER

CROSS-REFERENCE TO RELATED APPLICATION

This application claims the benefit of U.S. Provisional Patent Application No. 61/597,155, filed Feb. 9, 2012, which is incorporated herein by reference.

FIELD

The subject matter of this application relates generally to internal combustion engines, and more specifically to fuel ignition systems of internal combustion engines.

BACKGROUND

Spark plugs are used in conjunction with various types of combustion chamber configurations to initiate a flame in a flammable fuel and air mixture. Some combustion chamber configurations include passive pre-chamber, open chamber, and fuel fed pre-chamber configurations. Prior art spark plug designs suffer from various shortcomings, which can be amplified depending on the type of combustion chamber configuration in which the spark plug is operating.

As is known, spark plugs, in combination with pre-chambers and open chambers, are used to initiate combustion events within internal combustion engines. Pre-chamber are particularly useful for initiating and propagating the combustion flame for pre-mixed, lean-burn natural gas engines which can be difficult to ignite using conventional open chamber type configurations. Passive pre-chambers include a combustion volume in which the spark plug is located. The combustion volume of the pre-chamber is linked to the main combustion chamber by the use of orifices or nozzles. The spark plugs tend to include a central cathode electrode and one or more outer ground or anode electrodes, which at least partially surround the cathode electrode to create a gap therebetween. The spark plug initiates a combustion event by generating a spark (e.g., electron current) that spans the gap between the central and outer electrodes. More specifically, the spark initiates a flame that propagates through the pre-chamber volume. This combustion creates a sudden increase in pressure in the pre-chamber creating a large pressure difference across the orifices between the pre-chamber and main chamber. The pressure difference forces the flame to propel through the orifices into the main combustion chamber resulting in a successful combustion event.

After a successful combustion event, the residual exhaust gases in the main chamber are scavenged during the exhaust stroke. During the intake stroke, a fresh, pre-mixed air and fuel mixture (charge) is pushed into the main cylinder via a compression event driven by a piston. Some residual exhaust gases in the passive pre-chamber volume and between the spark plug electrodes, however, are not completely scavenged and remain within the pre-chamber during the exhaust and intake strokes. During the subsequent compression stroke, the pressure difference between the main chamber and pre-chamber increases forcing a fresh charge through the orifices into the pre-chamber, which compresses the residual exhaust gases towards the backside of the pre-chamber where the spark plug is located.

SUMMARY

The subject matter of the present application has been developed in response to the present state of the art, and in particular, in response to the problems and needs in the combustion chamber and spark plug art that have not yet been fully solved by currently available combustion chamber and spark plugs. Ignition will only be successful if towards the end of the compression stroke (e.g., at the time of spark), at least some of the residual exhaust gases in the electrode gap are purged (e.g., moved or displaced) from within the gap and replaced with fresh charge. Applicant recognizes that the success of the residual exhaust gas purging process is highly dependent on the designs of the pre-chamber, orifice, and spark plug electrodes. Some known spark plug electrode configurations fail to adequately purge the residual gases from the electrode gap. As a consequence, the residual gases within the gap can inhibit or obstruct the combustion of a fresh air charge because the spark generated across the gap will be unable to properly reach the fresh air charge being displaced by the residual gases, which can result in poor combustion or total misfire. Accordingly, the subject matter of the present application has been developed to provide a combustion chamber and associated spark plug that overcome many of the shortcomings of the prior art.

For example, according to one embodiment, According to one embodiment, a spark plug for an internal combustion engine includes a central electrode that terminates at a first distal end surface defined about a central axis. The spark plug also includes at least one outer electrode that terminates at a second distal end surface. The at least one outer electrode at least partially laterally surrounds the central electrode such that the second distal end surface is radially offset relative to the central electrode and a lateral gap is defined between the central electrode and the at least one outer electrode. The first distal end surface of the central electrode is axially recessed relative to the second distal end surface of the at least one outer electrode.

In some implementations of the spark plug, the first distal end surface of the central electrode and the second distal end surface of the at least one outer electrode are substantially co-planar. In certain implementations, the spark plug has a plurality of outer electrodes. The first distal end surface of the central electrode can be recessed up to about one millimeter relative to the second distal end surface of the at least one outer electrode. According to some implementations, the central electrode includes a cylindrical head that defines the first distal end surface. In such implementations, the central electrode can further include a stem supporting the head relative to the at least one outer electrode such that the lateral gap is defined between the head of the central electrode and the at least one outer electrode.

According to another embodiment, a spark plug for an internal combustion engine includes a central electrode that terminates at a first distal end surface, which is defined about a central axis. The spark plug also includes at least one outer electrode that terminates at a second distal end surface. The at least one outer electrode at least partially laterally surrounds the central electrode such that the second distal end surface is radially offset relative to the central electrode and a lateral gap is defined between the central electrode and the at least one outer electrode. The spark plug includes at least one pad coupled to the second distal end surface of the at least one outer electrode, wherein a third distal end surface of the at least one pad is axially offset relative to the first distal end surface of the central electrode. The pad can be made from a first material and the at least one outer electrode can be made from a second material that is different than the first material.

According to some implementations, the spark plug includes a plurality of outer electrodes and a plurality of pads, wherein each of the plurality of outer electrodes is coupled to a respective one of the plurality of pads.

In certain implementations, the spark plug has a plurality of outer electrodes and only two pads each coupled to a respective two of the plurality of outer electrodes. The respective two of the plurality of outer electrodes with pads coupled thereto can be adjacent each other. The respective two of the plurality of outer electrodes with pads coupled thereto can be on opposing sides of the at least one outer electrode.

According to yet another embodiment, a spark plug for an internal combustion engine includes a central electrode that terminates at a first distal end surface defined about a central axis. The central electrode includes at least one elongate channel formed in the first distal end surface. The spark plug also includes at least one outer electrode terminating at a second distal end surface with the at least one outer electrode at least partially laterally surrounding the central electrode such that the second distal end surface is radially offset relative to the central electrode and a lateral gap is defined between the central electrode and the at least one outer electrode.

According to some implementations, the central electrode includes at least two elongate channels formed in the first distal end surface. The at least two elongate channels can extend diametrically across the first distal end surface perpendicularly relative to each other.

In another embodiment, a spark plug for an internal combustion engine includes a central electrode that terminates at a first distal end surface defined about a central axis. The central electrode includes a plurality of notches formed in the first distal end surface about an outer periphery of the first distal end surface. The spark plug also includes at least one outer electrode that terminates at a second distal end surface with the at least one outer electrode at least partially laterally surrounding the central electrode such that the second distal end surface is radially offset relative to the central electrode and a lateral gap is defined between the central electrode and the at least one outer electrode. Each of the plurality of notches can be substantially wedge shaped. Further, the plurality of notches can be spaced an equal distance apart from each other about the outer periphery of the first distal end surface.

According to one embodiment, a spark plug for an internal combustion engine includes a central electrode that terminates at a first distal end surface defined about a central axis. The spark plug includes at least one outer electrode that terminating at a second distal end surface with the at least one outer electrode at least partially laterally surrounding the central electrode such that the second distal end surface is radially offset relative to the central electrode and a lateral gap is defined between the central electrode and the at least one outer electrode. At least one of the first distal end surface of the central electrode and the second distal end surface of the at least one outer electrode is tapered.

In some implementations, the first distal end surface of the central electrode is tapered. The first distal end surface of the central electrode can be tapered at an angle relative to the second distal end surface of the at least one outer electrode. The angle can be between about 1-degree and about 25-degrees. In some implementations, the second distal end surface of the at least one outer electrode is tapered. The second distal end surface of the at least one outer electrode can be tapered at an angle relative to the first distal end surface of the central electrode between about 1-degree and about 25-degrees. In some implementations, the first distal end surface of the central electrode is tapered and the second distal end surface of the at least one outer electrode is tapered.

In another embodiment, a pre-chamber apparatus for use with an internal combustion engine having a cylinder head coupled to a cylinder block is described. The cylinder head includes a spark plug recess and the cylinder block includes a main combustion chamber that is open to the spark plug recess. The cylinder head further includes a fire deck surface that faces the main combustion chamber. The pre-chamber apparatus includes an insert that is positionable within and securely mateable with the spark plug recess. The insert includes a distal end surface, an interior chamber, and at least one channel extending between the interior chamber and the distal end surface. When positioned within and securely mated with the spark plug recess, the distal end surface of the insert is substantially flush with the fire deck surface of the cylinder head. Pre-chamber apparatus may also include a spark plug with cathode and anode electrodes. The spark plug is coupleable to the insert such that at least a portion of the electrodes of the spark plug are positioned within the interior chamber of the insert.

In some implementations of the pre-chamber apparatus, the insert includes external threads that are threadably engageable with internal threads of the spark plug recess to securely mate the insert with the spark plug recess. The insert may include a plurality of channels that extend between the interior chamber and the distal end surface.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
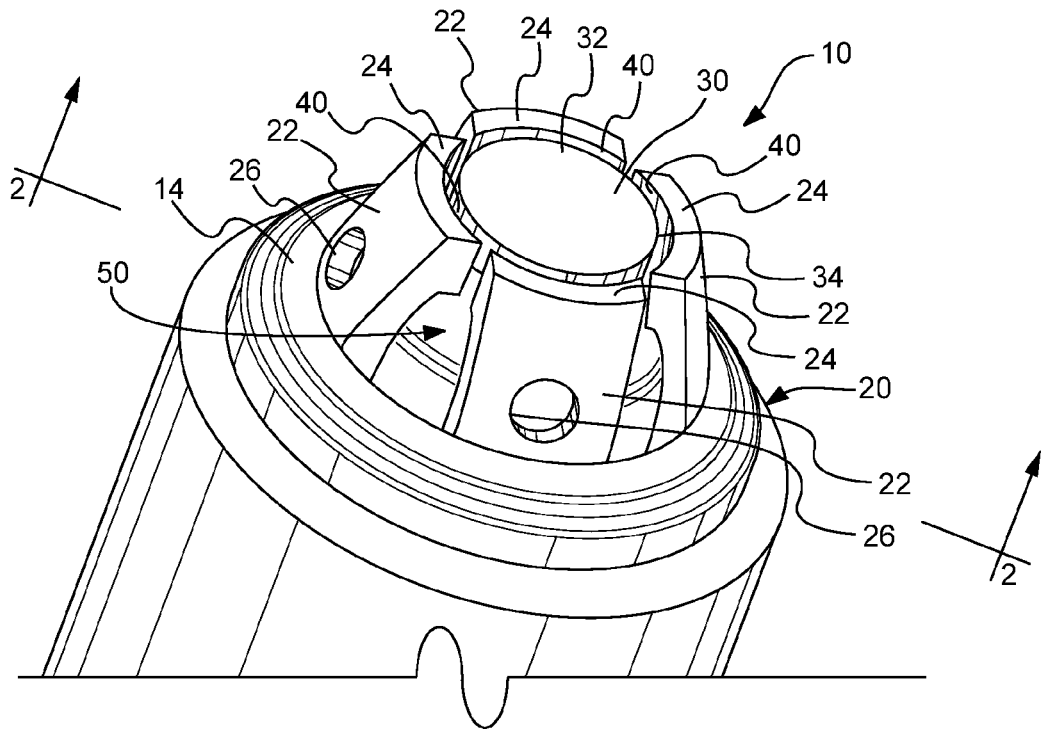
FIG. 1 is a perspective top view of a spark plug according to one embodiment.
Figure 2:
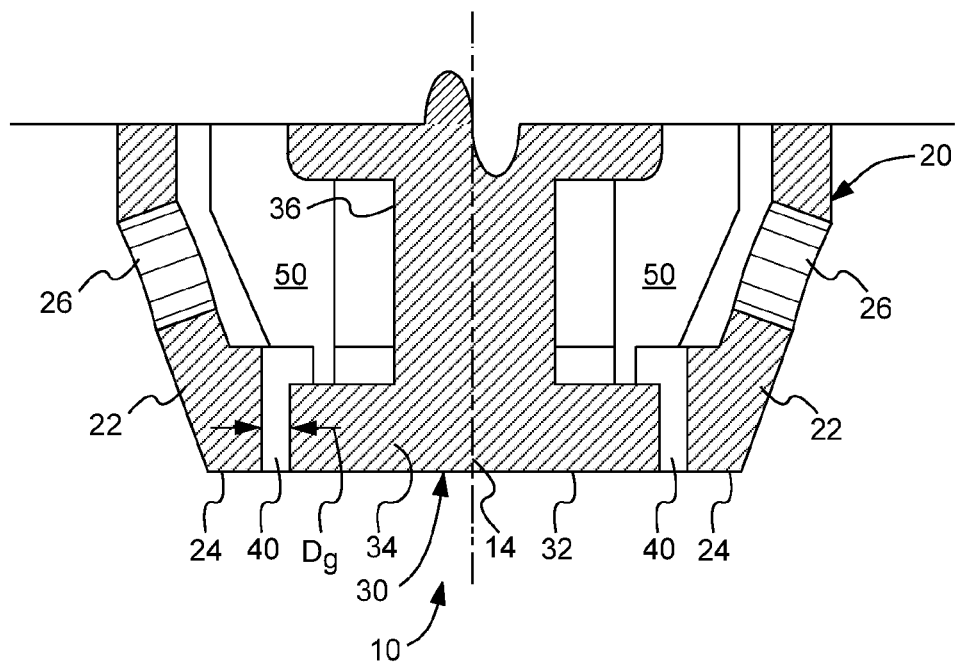
FIG. 2 is a cross-sectional side view of the spark plug of FIG. 1 taken along the line 2-2 of FIG. 1.

Referring to FIGS. 1 and 2, a spark plug 10 according to one embodiment includes an outer ground electrode portion 20 with a plurality of outer ground electrodes 22. The outer ground electrodes 22 can be defined as outer anodes or anode electrodes. Further, the spark plug 10 includes a central cathode electrode 30 about which the outer ground electrodes 22 are positioned. Generally, the outer electrodes 22 at least partially laterally surround or are positioned laterally about the central electrode 30. In other words, the outer electrodes 22 are radially outwardly spaced-apart from the central electrode 30. The outer electrodes 22 extend from a proximal end to a distal end adjacent a head 34 of the central electrode 30. In certain implementations, the outer electrodes 22 are angled radially inwardly toward a central axis 14 of the plug 10 in a proximal to distal direction as shown.

The plug 10 also includes an interior volume 50 located behind the outer electrodes 22 and head 34 of the central electrode 30 within an interior of the plug. Each outer electrode 22 includes an aperture 26 that facilitates the flow of fresh charge and exhaust gas into and out of the interior volume 50. Additionally, the outer electrodes 22 each includes a distal end surface 24 that is substantially perpendicular to the central axis 14. Although the spark plugs illustrated herein include a circular central electrode and four spaced-apart concentric outer electrodes, in some embodiments, the spark plugs can include different shaped central electrodes with fewer or more than four outer electrodes. For example, in one embodiment, a spark plug includes a single outer electrode that surrounds the central electrode, and in another embodiment a spark plug includes a single square central electrode with four concentric outer electrodes.

The central electrode 30 includes a head 34 coupled to a stem 36. The head 34 defines a distal end surface 32 that is substantially perpendicular to the central axis 14 and substantially coplanar with the distal end surface 24 of each outer electrode 22. The outer electrodes 22 and head 34 of the central electrode 30 are sized, shaped, and positioned to define lateral electrode gaps 40 between the respective outer electrodes and the head. As defined herein, lateral can mean perpendicular to the central axis 14 or extending in a radial direction relative to the central axis 14. Accordingly, laterally offset can mean offset or spaced-apart in a lateral direction from the central axis 14. As shown in the cross-sectional side view of the plug 10 in FIG. 2, the gap 40 has a distance $D_g$. The distance $D_g$ is selected generally to provide an optimum desired spark across the gaps 40. The lateral gaps 40 between the head 34 and outer electrodes 22 are substantially uniform. In one implementation, the head 34 is substantially cylindrically shaped with a diameter defining the size of the head. Similarly, each of the outer electrodes 22 is curved at a radius of curvature corresponding with the diameter of the head 34 such that the distance $D_g$ of the gap 40 remains constant.

Figure 3:
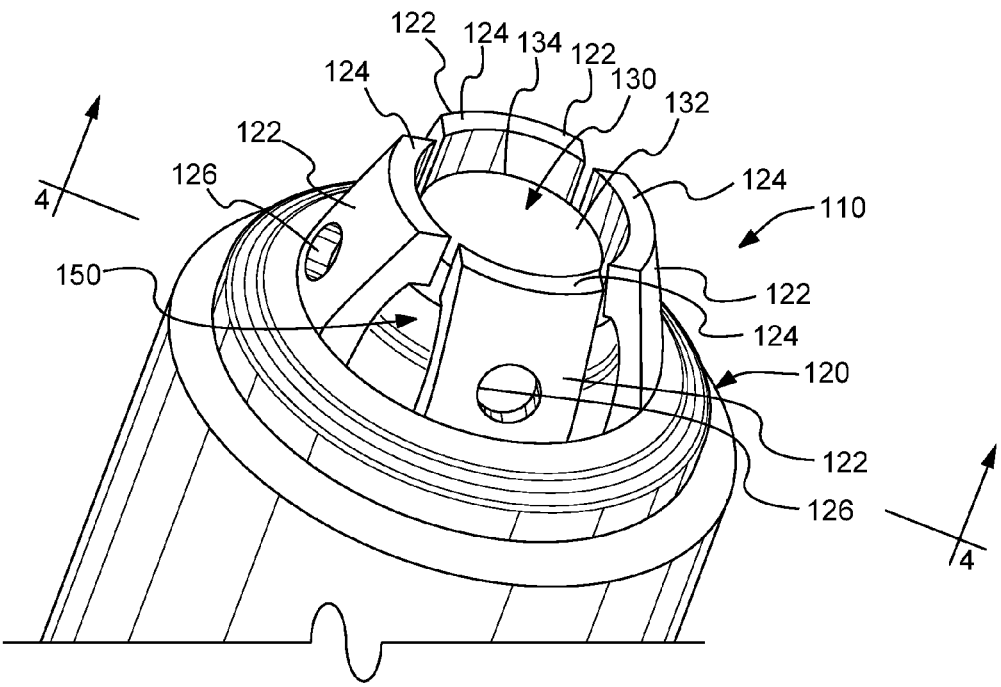
FIG. 3 is a perspective top view of a spark plug having a recessed central electrode according to one embodiment.
Figure 4:
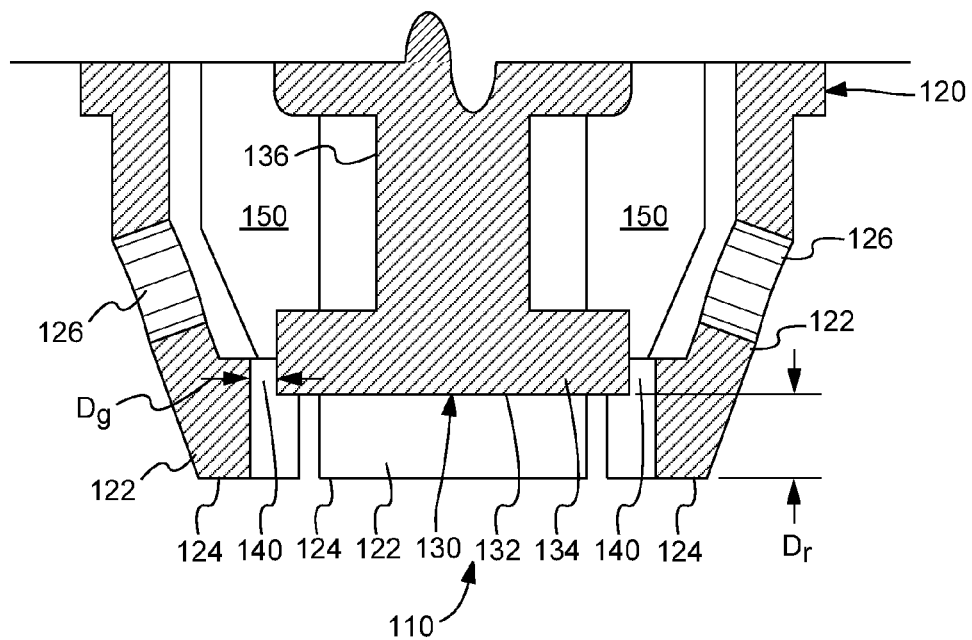
FIG. 4 is a cross-sectional side view of the spark plug of FIG. 3 taken along the line 4-4 of FIG. 3.

Referring to FIGS. 3 and 4, a spark plug 110 with a recessed central electrode 130 according to one embodiment is shown. The plug 110 is similar to the plug 10, with like numbers referring to like elements. However, instead of positioning the head 134 of the central electrode 130 relative to the outer electrodes 122 such that the respective distal surfaces 124, 132 of the outer electrodes and head are co-planar, the head 134 is inwardly recessed (e.g., axially offset) relative to the outer electrodes such that the distal surface of the head is positioned axially inwardly relative to the distal surfaces of the outer electrodes by a distance $D_r$. The recess distance $D_r$ can be any of various distances. According to some implementations, the recess distance $D_r$ is more than zero and less than or equal to about 1 mm. In certain implementations, the distal surfaces 124, 132 may not be co-planar due the recessed nature of the head 134, but the distal surfaces may nevertheless be parallel to each other. Notwithstanding the head 134 being recessed relative to the outer electrodes 122, the distance $D_g$ of the lateral gap 140 is maintained. Further, although the surface area of the recessed head 134 defining the gap 140 is less with the plug 110 than the non-recessed head 34 defining the gap 40 of the plug 10, in some embodiments, the surface area of the outer electrodes 122 defining the gap can be increased by elongating the surface area axially inwardly. In this manner, the quality of the spark between the electrodes 122, 130 and the wear on the electrodes is not diminished due to the recessed nature of the head 134.

The head 134 of the central electrode 130, being recessed by the distance $D_r$, helps force (e.g., redirect) the incoming fresh air-fuel mixture directed at the central electrode (by virtue of the orientation of the orifices and the mechanism of the compression stroke) radially outwardly toward the outer electrodes 122 and then through the lateral gaps 140 between the head and outer electrodes. The forced or redirected movement of the flow of the fresh air-fuel mixture through the lateral gaps 140 helps to purge or move the residual exhaust gases left over from the previous combustion event out of the lateral gaps 140. The fresh air-fuel mixture then flows from the lateral gaps 140 into the internal volume 150 behind the electrodes 122, 130 away from the spark initiation site (i.e., within the lateral gaps 140). In this manner, the lateral gaps 140 are substantially purged of residual exhaust gas and replaced with fresh air/fuel mixture at the time of spark ignition (e.g., generally between 20-degrees and 16-degrees before top dead center (BTDC)).

Based on computational fluid dynamics analyses, the recessed head spark plug 110 purges residual exhaust gas from the lateral gaps between central and outer electrodes better than the non-recessed head spark plug 10. The computational fluid dynamics analyses were based on spark plug models where the head 134 of the plug 110 is recessed only 1 mm relative to the non-recessed plug. Further, actual tests were conducted on an internal combustion engine and measurements were taken that substantiate the results obtained from the computational fluid dynamics or theoretical tests. For instance, an actual internal combustion engine operating with non-recessed or conventional spark plugs resulted in misfiring cycles, whereas the same internal combustion engine operating with recessed spark plugs configured according to the embodiments described herein virtually eliminated the misfire when used in combination with a pre-chamber. The recessed spark plugs used in the actual testing of the internal combustion engine and promoting the virtual elimination of misfire had recess distances $D_r$ between about 0.4 mm and about 0.6 mm.

Again, based on computational fluid dynamics analyses, during the compression stroke at 20-degrees BTDC, the velocity of fluid flow through the gaps 140 between the recessed head and outer electrodes is greater than the velocity of the fluid flow through the gaps 40 between the non-recessed head and outer electrodes.

Similarly, using computational fluid dynamics analyses, the methane ($CH_4$) mass fraction of the fluid within the gaps 140 between the recessed head and outer electrodes and in the immediate vicinity in the volume behind the electrodes is greater than the methane mass fraction of the fluid flow within the gaps 40 between the non-recessed head and outer electrodes and in the volume behind the electrodes. With more methane, which is a component of the fresh air-fuel mixture induced during the compression stroke, within the gaps and in the vicinity of the gaps behind the electrodes, the conditions for the spark to occur and develop into a flame front are more favorable compared to the non-recessed head plug. Accordingly, the quality of combustion with a recessed head is greater than a non-recessed head, and the risk of misfire is less with a recessed head than with a non-recessed head. In contrast, the carbon-dioxide ($CO_2$) mass fraction of the fluid within the gaps 140 between the recessed head and outer electrodes and in the immediate vicinity in the volume behind the electrodes is much less than the carbon-dioxide mass fraction of the fluid flow within the gaps 40 between the non-recessed head and outer electrodes and in the volume behind the electrodes. With less carbon-dioxide (i.e., a component of the residual exhaust gases leftover after a combustion event) within the gaps 140 of the recessed head plug, the quality of the spark is less impeded compared to the non-recessed head plug, such that the quality of combustion with a recessed head is greater than a non-recessed head, and the risk of misfire is less with a recessed head than with a non-recessed head.

Figure 5:
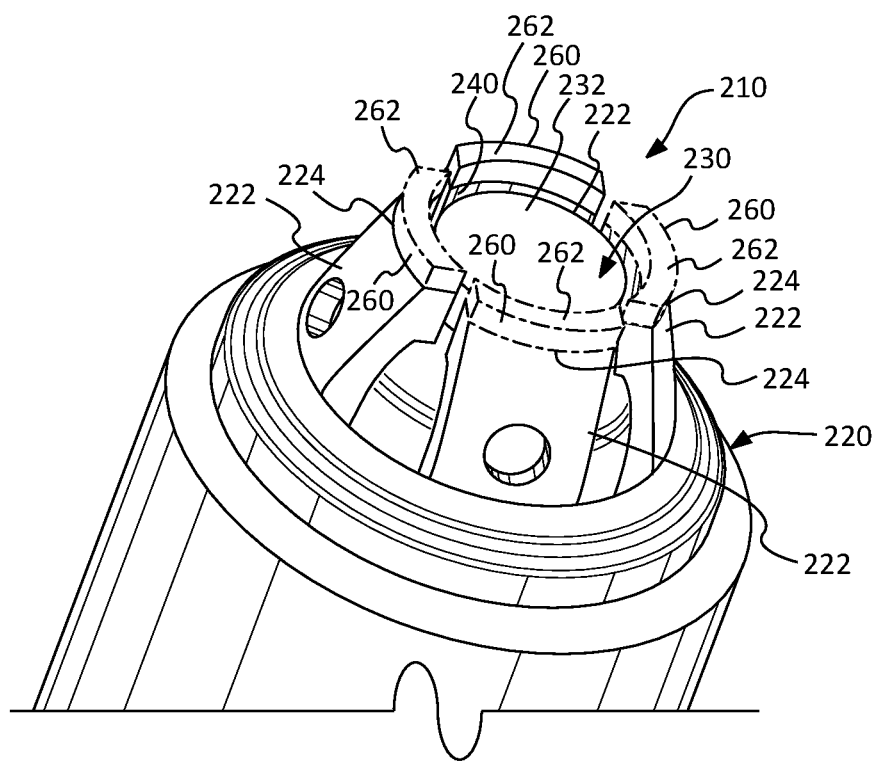
FIG. 5 is a perspective top view of a spark plug with at least two electrode pads according to one embodiment.

Referring now to FIG. 5, another embodiment of a spark plug 210 is shown that may be used in combination with a passive pre-chamber, fuel fed pre-chamber, or open chamber to help purge exhaust gas residuals from the plug gap by helping to direct the incoming fresh air/fuel mixture through the electrode gap, similar to that described above for the recessed central electrode. The plug 210 is similar to the plugs 10, 110 with like numbers referring to like elements. In other words, the plug 210 includes a central electrode 230 with a distal surface 232 surrounded by a plurality of (e.g., four) outer electrodes 222 each with a distal surface 224. However, the plug 210 includes at least one pad 260 secured to at least one of the outer electrodes according to respective embodiments as will be described in more detail below.

In the illustrated embodiment, the distal surface 232 of the central electrode 230 of the plug 210 is substantially co-planar with the distal surfaces 232 of the outer electrodes 222. To improve the purging of residual exhaust gases in the lateral gap 240 between the central and outer electrodes, a plurality of pads 260 each is secured to a distal surface 224 of a respective outer electrode 222. The pads 260 effectively extend the distal surfaces 224 of the outer electrodes 222 axially outward away from the distal surface 232 of the central electrode 230 such that the distal surfaces 262 of the pads (e.g., the effective distal surfaces of the outer electrodes) are not planar with the distal surface 232 of the central electrode. In other words, with the pads 260 secured to the distal surfaces 224 of the outer electrodes 222, the distal surface 232 of the central electrode 230 is effectively axially inwardly recessed relative to the distal surfaces 262 of the pads. In this manner, the above-discussed benefits of recessing the distal surface 232 of the central electrode 230 relative to the distal surfaces 224 of the outer electrodes 222 are realized with the addition of the pads 260 without physically recessing the head 230 relative to the outer electrodes 222. However, in some embodiments, the plug 210 may have a head with a distal surface 232 that is recessed relative to the distal surfaces 232 of the outer electrodes 222. In such embodiments, the pads 260 act to effectively increase the distance $D_r$ of the recessed head.

As mentioned above, the plug 210 includes at least one pad 260 secured to a respective one of the outer electrodes 222. Accordingly, in the illustrated embodiment, only one of the pads 260 is shown in solid lines. However, in other embodiments, the plug 210 includes between two and four pads 260, with each pad secured to a respective one of the outer electrodes 222. Accordingly, to show that alternative pad configurations are recognized, three of the four pads 260 are shown in dashed lines. More specifically, some of the pads 260 are shown in dashed lines to represent the optional configurations of the plug 210 with respect to the number and placement of the pads. For example, in one embodiment, the plug 210 includes the pad 260 shown in solid lines, and only one of the pads shown in dashed lines such that the plug 210 includes a total of two pads. The second pad 260 can be any one of the pads 260 shown in dashed lines. In one implementation, the second pad 260 is the pad 260 secured to the outer electrode 222 positioned opposite the outer electrode to which the pad 260 shown in solid lines is attached to form a staggered configuration. In other implementations, the second pad 260 is one of the pads 260 secured to the outer electrode 222 adjacent the outer electrode to which the pad 260 shown in solid lines is attached to form a side-by-side configuration.

In some embodiments, more than two pads 260 are secured to more than two respective outer electrodes 222. For example, in one embodiment, the plug 210 includes three pads 260 (e.g., the pad 260 shown in solid lines and any two of the pads 260 shown in dashed lines) secured to three respective outer electrodes. In other embodiments, the plug 210 includes four pads 260 (e.g., the pad 260 shown in solid lines and all three of the pads shown in dashed lines) each secured to a respective one of the four outer electrodes 222.

Although the embodiments described above are associated with a plug 210 having four outer electrodes, in some embodiments, the plug can have fewer or more than four outer electrodes. In such latter embodiments, the number and configuration of the pads with respect to the number and configuration of the plugs can vary. For example, plugs with a single concentric outer electrode can have a single annular pad secured to the single outer electrode, or any number of spaced-apart plugs secured about the single electrode as desired. Alternatively, for plugs with two, three, or more than four outer electrodes, any one or more of the outer electrodes can include a pad secured thereto as desired.

The pads 260 of the plug 210 can be made from any of various materials. In one embodiment, the pads 260 are made from a metal, such as platinum, or some other precious metal. The material of the pads 260 can be different than the material of the outer electrodes. The configuration of the pads 260 can be modified based on the application or desired characteristics of the system. For example, the height and width of the pads 260 can be modified to achieve different results. The pads 260 can be secured to the distal ends 224 of the outer electrodes 222 using any of various attachment techniques known in the art, such as, for example, welding, adhering, fastening, etc.

Figure 6:
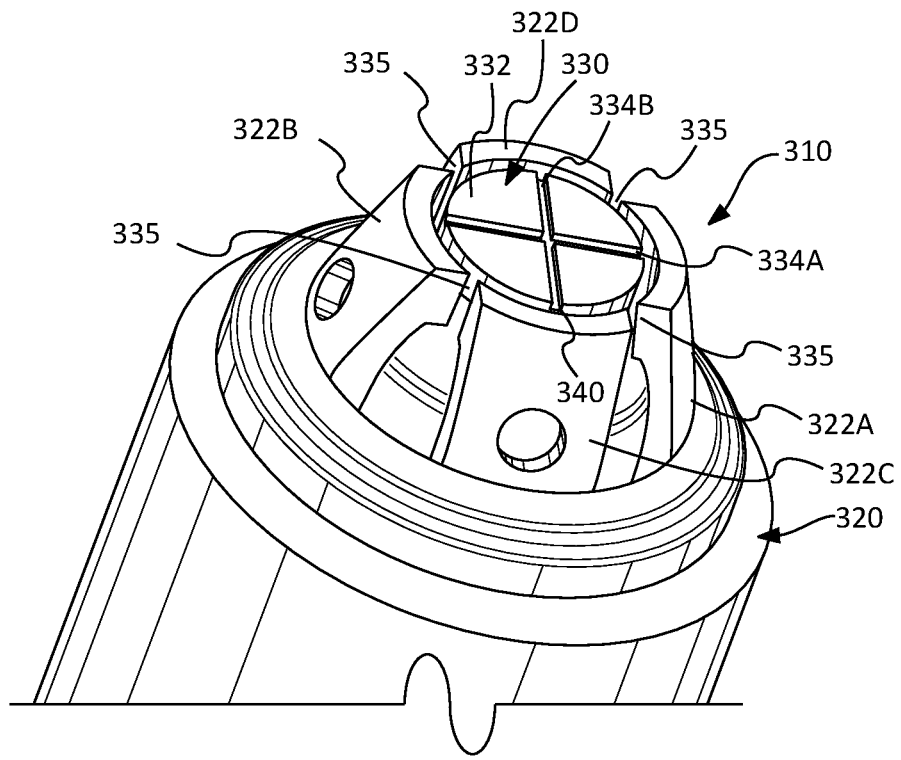
FIG. 6 is a perspective top view of a spark plug with electrode channels according to one embodiment.

Referring to FIG. 6, another embodiment of a spark plug 310 is shown that may be used in combination with a passive pre-chamber, fuel fed pre-chamber, or open chamber to help purge exhaust gas residuals from the plug gap by helping to direct the incoming fresh air/fuel mixture through the electrode gap, similar to that described above for the recessed central electrode. The plug 310 is similar to the plugs 10, 110 with like numbers referring to like elements. For example, the plug 310 includes a central electrode 330 with a distal surface 332 surrounded by a plurality of outer electrodes 322 each with a distal surface 324. In the illustrated embodiment, the distal surface 332 of the central electrode 330 is substantially coplanar (e.g., non-recessed) with the distal surfaces 324 of the outer electrodes 322. However, in other embodiments, the distal surface 332 of the central electrode 330 can be non-coplanar (e.g., recessed) with the distal surfaces 324 of the outer electrodes 322.

Whether recessed or not, instead of the distal surface 332 of the central electrode 330 being a single surface, as with the plugs 10, 110, the distal surface 332 is divided into four distal sub-surfaces by the multiple channels 334A, 334B formed in the distal surface 332. In the illustrated embodiment, the channels 334A, 334B include a first channel 334A extending diametrically from one side of the central electrode 330 adjacent a first outer electrode 322A to the opposite side of the central electrode adjacent a second outer electrode 322B opposite the first outer electrode. Similarly, a second channel 334B extends perpendicularly relative to the first channel 334A and diametrically from one side of the central electrode 330 adjacent a third outer electrode 322C between the first and second outer electrodes 322A, 322B to an opposite side of the central electrode adjacent a fourth outer electrode 322D opposite the third outer electrode. Accordingly, the channels 334A, 334B divide the distal surface 332 of the central electrode 330 into four equal quadrants. The channels 334A, 334B assist in directing incoming fresh air/fuel mixture (driven into the central electrode 330 during the compression stroke) radially outward toward the outer electrodes 322A-D and through the lateral gaps 340 between the central and outer electrodes. The fresh air/fuel mixture directed through the gaps 340 helps to purge or displace the residual exhaust gases remaining within in the gaps.

In certain embodiments, the channels 334A, 334B may have any of various angular orientations on the central electrode 330. For example, in some embodiments, the angular orientation of the channels 334A, 334B on the central electrode 330 can effectively rotated 45-degrees relative to the angular orientation of the channels on the central electrode 330 of the illustrated embodiment of FIG. 6. In other words, in such embodiments, the channels 334A, 334B of the central electrode 330 extend diametrically from one side of the central electrode 330 adjacent a respective circumferential gap 335 between outer electrodes 322 to the opposite side of the central electrode adjacent an opposing circumferential gap 335.

The channels 334A, 334B can have any of various widths and depths depending on desired flow and/or combustion characteristics. Moreover, the width and/or depth need not be constant along the entire length of the channels 334A, 334B. For example, in some implementations, the width of the channels 334A, 334B may narrow or widen along the length of the channels (e.g., narrow from a maximum width at a central axis of the plug to a minimum width at the radially outer periphery of the central electrode). Similarly, in some implementations, the depth of the channels 334A, 334B may deepen or become less deep along a length of the channels. Further, although the illustrated embodiment of the plug 310 includes two diametrically extending channels 334A, 334B, in other embodiments, more or fewer than two diametrically extending channels can be implemented as desired. Additionally, although the channels 334A, 334B extend an entire diameter of the central electrode head, in some embodiments, the channels may extend only partially across a diameter of the central electrode head (e.g., to form a chord of the central electrode head).

Figure 7:
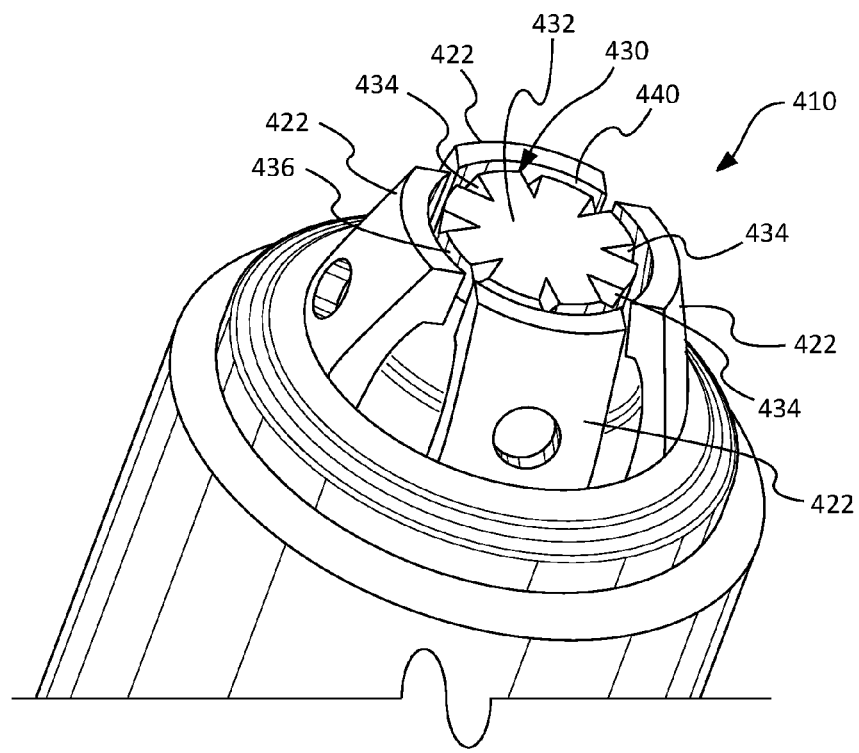
FIG. 7 is a perspective top view of a spark plug with electrode peripheral grooves according to one embodiment.

Referring to FIG. 7, a spark plug 410 with peripheral notches 434 formed in the central electrode according to one embodiment is shown. The spark plug 410 may be used in combination with a passive pre-chamber, fuel fed pre-chamber, or open chamber to help purge exhaust gas residuals from the plug gap by helping to direct the incoming fresh air/fuel mixture through the electrode gap, similar to that described above for the recessed central electrode. The plug 410 is similar to the plug 10, with like numbers referring to like elements. For example, the plug 410 includes a central electrode 430 with a distal surface 432 surrounded by a plurality of outer electrodes 422 each with a respective distal surface 424. In the illustrated embodiment, the distal surface 432 of the central electrode 430 is substantially coplanar (e.g., non-recessed) with the respective distal surfaces 424 of the outer electrodes 422. However, in other embodiments, the distal surface 432 of the central electrode 430 can be non-coplanar (e.g., recessed) with the distal surfaces 424 of the outer electrodes 342.

Whether recessed or not, instead of the distal surface 432 of the central electrode 430 being substantially void of surface features, as with the plugs 10, 110, the distal surface 432 includes a plurality of grooves, notches, or serrations 434 formed in the central electrode about an outer periphery 436 of the central electrode. The peripheral grooves 434 of the plug 410 can have any of various sizes and shapes. For example, the peripheral grooves 434 can be substantially wedge shaped as shown and have any of various depths and angles relative to the distal end surface 432 of the central electrode 430. Also, the grooves 434 can have any of various cross-sectional shapes, such as triangular as shown, or semi-circular, rectangular, and the like. Additionally, dependent or independent of the size of the grooves, each central electrode can have any number of grooves 434 positioned about the periphery of the central electrode. The grooves 434 can be an equal distance apart from each other as shown, or the spacing between the grooves 434 can vary from one groove to the next. Similar to the channels 334A, 334B of the plug 310, the peripheral grooves 434 of the plug 410 assist in directing incoming fresh air/fuel mixture (driven into the central electrode during the compression stroke) radially outward toward the outer electrodes 422, and through the lateral gaps 440 between the central and outer electrodes. The incoming fresh air/fuel mixture directed through the gaps 440 assists in purging or displacing the residual exhaust gases within the gaps.

Figure 8:
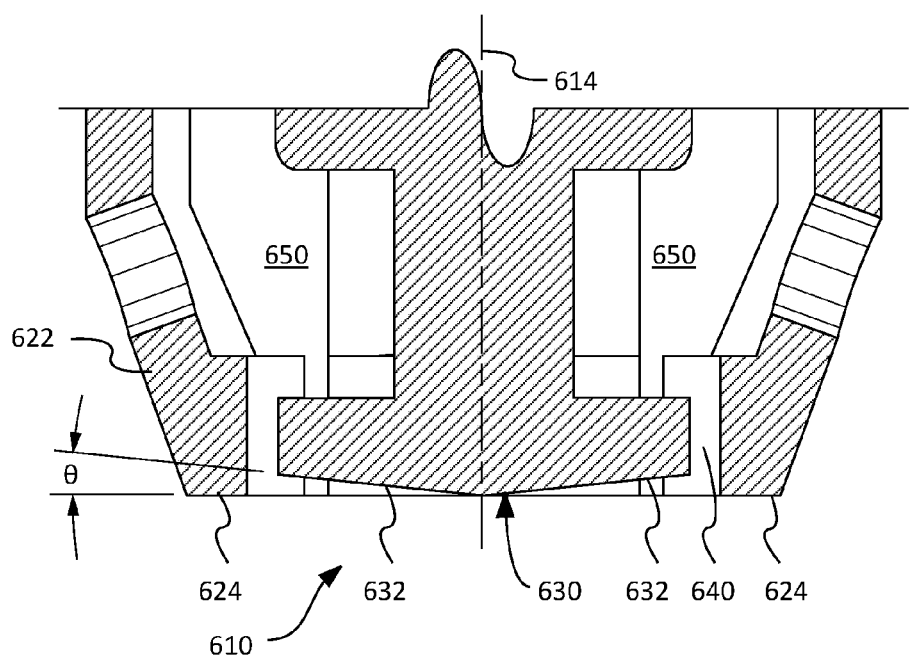
FIG. 8 is a cross-sectional side view of a spark plug with a tapered central electrode according to one embodiment.

Referring to FIG. 8, a spark plug 610 with a tapered central electrode 630 according to one embodiment is shown. The spark plug 610 may be used in combination with a passive pre-chamber, fuel fed pre-chamber, or open chamber to help purge exhaust gas residuals from the plug gap by helping to direct the incoming fresh air/fuel mixture through the electrode gap, similar to that described above for the recessed central electrode. The spark plug 610 is similar to the plug 10, with like numbers referring to like elements. For example, the plug 610 includes a central electrode 630 with a distal surface 632 surrounded by a plurality of outer electrodes 622 each with a distal surface 624. In the illustrated embodiment, the central electrode 630 is non-recessed with respect to the distal surfaces 624 of the outer electrodes 622. However, in other embodiments, the central electrode 630 can be recessed with respect to the distal surfaces 624 of the outer electrodes 642.

Whether the central electrode 630 is recessed or non-recessed, the distal surface 632 of the central electrode 630 is not coplanar with the distal surfaces 624 of the outer electrodes 622. Rather, the distal surface 632 tapers in a radially outward direction away from a central axis 614 of the plug 610 at an angle θ relative to the distal surfaces 624 of the outer electrodes 622. Accordingly, the distal surface 632 of the central electrode 630 defines a substantially conical-shaped surface with the apex of the cone being aligned with the central axis 614. Put another way, the distal surface 632 tapers inwardly toward the internal volume 650 from a central location on the distal surface. The angle θ of the tapered distal surface 632 can be any of various angles selected to assist in directing incoming fresh air/fuel mixture radially outward toward the outer electrodes 622, through the lateral gaps 640 between the central and outer electrodes, and into the internal volume 650. The incoming fresh air/fuel mixture directed through the gaps 640 helps purge or displace the residual exhaust gases in the gaps. In some implementations, the angle θ is between a about 1-degree and about 25-degrees. In one particular implementation, the angle θ is about 5-degrees.

Figure 9:
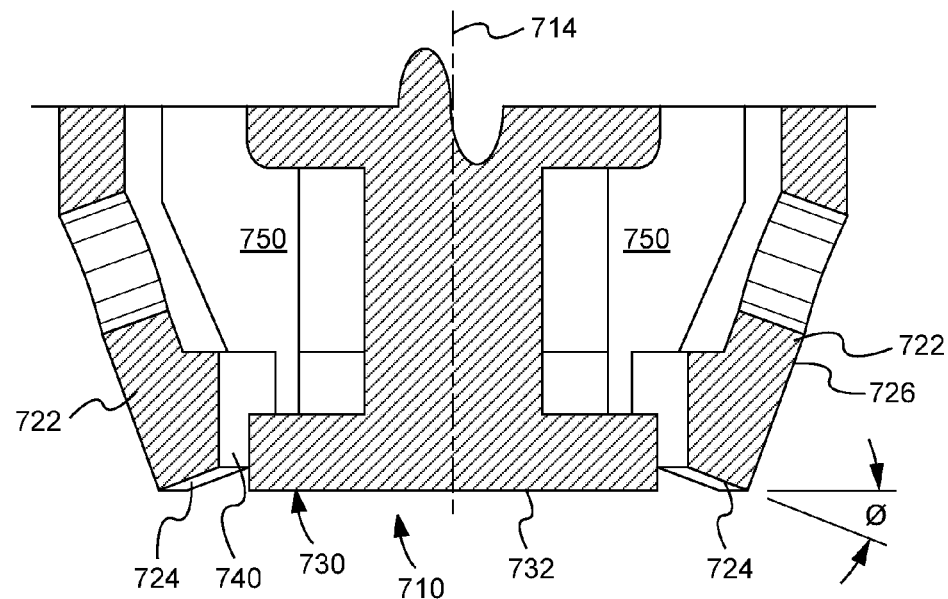
FIG. 9 is a cross-sectional side view of a spark plug with tapered outer electrodes according to one embodiment.

Referring to FIG. 9, a spark plug 710 with tapered outer electrodes 724 according to one embodiment is shown. The spark plug 710 may be used in combination with a passive pre-chamber, fuel fed pre-chamber, or open chamber to help purge exhaust gas residuals from the plug gap by helping to direct the incoming fresh air/fuel mixture through the electrode gap, similar to that described above for the recessed central electrode. The spark plug 710 is similar to the plug 10, with like numbers referring to like elements. For example, the plug 710 includes a central electrode 730 with a distal surface 732 surrounded by a plurality of outer electrodes 722 each with a distal surface 724. In the illustrated embodiment, the central electrode 730 is non-recessed with respect to the distal surfaces 724 of the outer electrodes 722. However, in other embodiments, the central electrode 730 can be recessed with respect to the distal surfaces 724 of the outer electrodes 742.

Whether the central electrode 730 is recessed or non-recessed, the distal surfaces 724 of the outer electrodes 722 are not coplanar with the distal surface 732 of the central electrode 730. Rather, the distal surfaces 724 taper in a radially inward direction toward a central axis 714 of the plug 710 at an angle φ relative to the distal surface 732 of the central electrode 730. Put another way, the distal surfaces 724 taper inwardly toward the internal volume 750 from an outer periphery 726 of the outer electrodes. The angle φ of the tapered distal surfaces 724 can be any of various angles selected to assist in directing incoming fresh air/fuel mixture through the lateral gaps 740 between the central and outer electrodes and into the internal volume 750. The incoming fresh air/fuel mixture directed through the gaps 740 helps purge or displace the residual exhaust gases in the gaps. In some implementations, the angle φ is between a about 1-degree and about 25-degrees. In one particular implementation, the angle φ is about 10-degrees.

Figure 10:
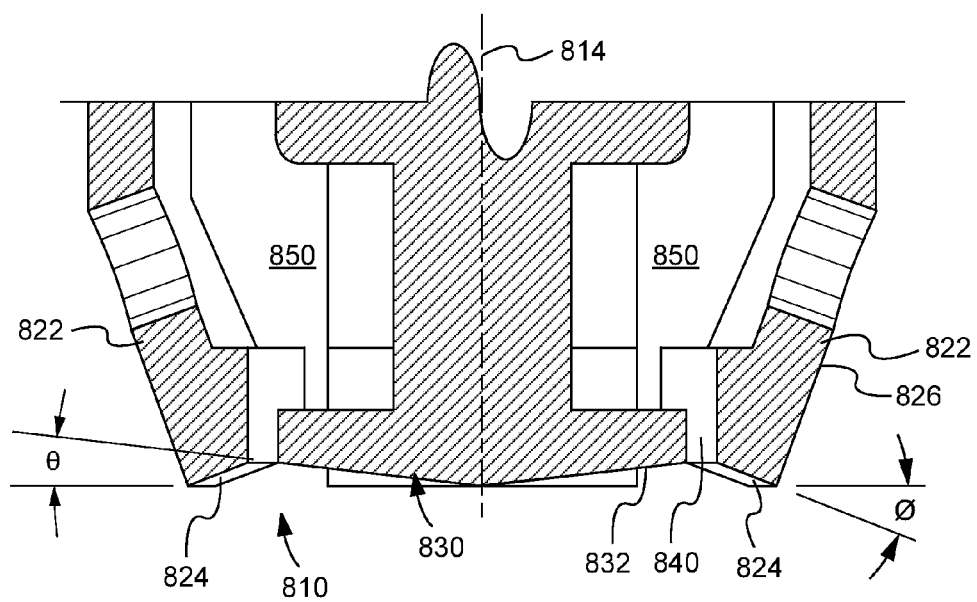
FIG. 10 is a cross-sectional side view of a spark plug with a tapered central electrode and tapered outer electrodes.

Referring to FIG. 10, a spark plug 810 with both a tapered central electrode 830 and tapered outer electrodes 824 according to one embodiment is shown. The spark plug 710 may be used in combination with a passive pre-chamber, fuel fed pre-chamber, or open chamber to help purge exhaust gas residuals from the plug gap by helping to direct the incoming fresh air/fuel mixture through the electrode gap, similar to that described above for the recessed central electrode. The spark plug 810 effectively combines the tapered surface features of the plugs 610 and 710 into a single plug to accentuate or improve the redirecting of the incoming fresh air/fuel mixture through the lateral gaps 840 between the central and outer electrodes 830, 822 and into the internal volume 850, to effectively purge the gaps of residual gases. The angles defining the tapered surfaces 824, 832 of the plug 810 can be the same as or similar to the angles described above in relation to the respective angled surfaces of the tapered outer and central electrodes of the plugs 610, 710.

Although some of the embodiments of a spark plug disclosed herein have been described as being operable in a passive pre-chamber based combustion system, it is recognized that the spark plug embodiments of the present disclosure may also be operable in other types of combustion systems. For example, some spark plug embodiments described herein (e.g., the recessed spark plug) may be operable in fuel fed pre-chamber and open chamber based combustion systems to achieve the same or similar residual exhaust gas purging advantages and benefits as described above. In fuel fed pre-chamber based combustion systems, fuel is fed directly into the pre-chamber. In open chamber based combustion systems, the spark plug is directly exposed to the main combustion chamber (i.e., there is no pre-chamber).

Figure 11:
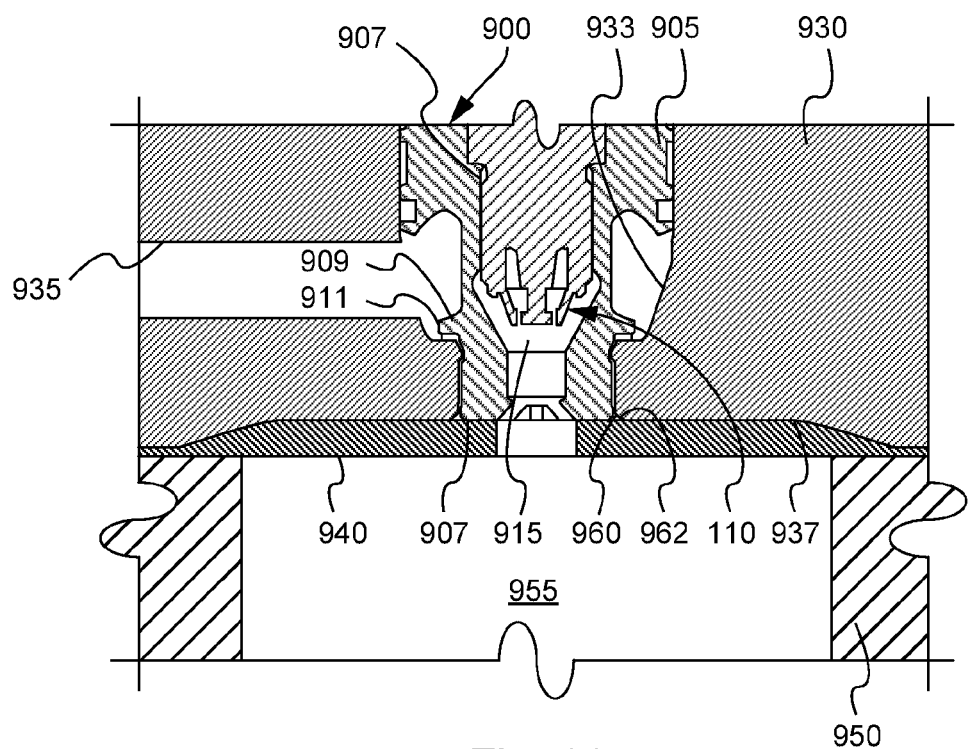
FIG. 11 is a cross-sectional side view of a passive pre-chamber with a recessed spark plug mounted to a main combustion chamber according to one embodiment.

According to one embodiment shown in FIG. 11, a flush-mounted passive pre-chamber apparatus 900 is mounted directly to the cylinder head 930 of an internal combustion engine. The cylinder head 930 of conventional internal combustion engines includes a plurality of spark plug recesses 933 for receiving a conventional spark plug. Typically, the conventional spark plug is fitted within a respective recess 933 such that all or part of the cathode and anode electrodes of the conventional spark plug are positioned within (e.g., directly exposed to) a respective main combustion chamber 955 of the engine or cylinder block 950 (see, e.g., FIG. 13) when the cylinder head 930 is mounted to the cylinder block. The recess 933 is fluidly coupled to an air-fuel mixture inlet 935 for receiving an air-fuel mixture from a source. Additionally, the engine typically includes a gasket 940 seated within a pocket defined by the lower surface or fire deck 937. The gasket 940 seals the connection between the cylinder head 930 and cylinder block 950.

As shown in FIG. 11, the conventional spark plug is replaced with the flush-mounted passive pre-chamber apparatus 900, which is fitted within the spark plug recess 933. The pre-chamber apparatus 900 includes a body or cap or insert 905 that defines a pre-chamber 915. The pre-chamber 915 effectively spatially separates the spark plug (e.g., spark plug 110) from the main combustion chamber 955. The body 905 includes one or more orifices or nozzles 910 that fluidly connect the pre-chamber 915 with the main combustion chamber 955. As discussed above, the pre-chamber facilitates the initiation and propagation of a combustion flame for pre-mixed, lean-burn gas engines. The body 905 is configured such that when installed within the recess 933, a lowermost surface 907 of the body is substantially flush with the fire deck 940 when properly installed within the recess 933 of the cylinder head 930. As shown, the body 905 includes a lip 909 that engages a corresponding ledge 911 of the recess 933 to prevent further downward movement of the apparatus 900. Generally, the body 905 is configured such that when the lip 909 is engaged with the ledge 911, the lowermost surface 907 is flush with the fire deck 940. The body 905 may include connectors 960 (e.g., external threads) matching connectors (e.g., external threads) found on conventional spark plugs. The connectors mate with corresponding connectors 962 (e.g., internal threads) formed within the recess 933 to secure the apparatus 900 to the cylinder head 930. Further, the body 905 includes pre-chamber inlet apertures for receiving the air-fuel mixture from the inlet 935 of the cylinder head.

The body 905 includes a receptacle 907 configured to receive and retain a spark plug 110 within the body such that the cathode and anode electrodes are positioned within the pre-chamber 915. As discussed above, the pre-chamber spark plug can be any of the various spark plugs shown in FIGS. 1-10 and correspondingly described above. Additionally, the pre-chamber spark plug can be any of various other spark plugs not specifically described herein.

Figure 12:
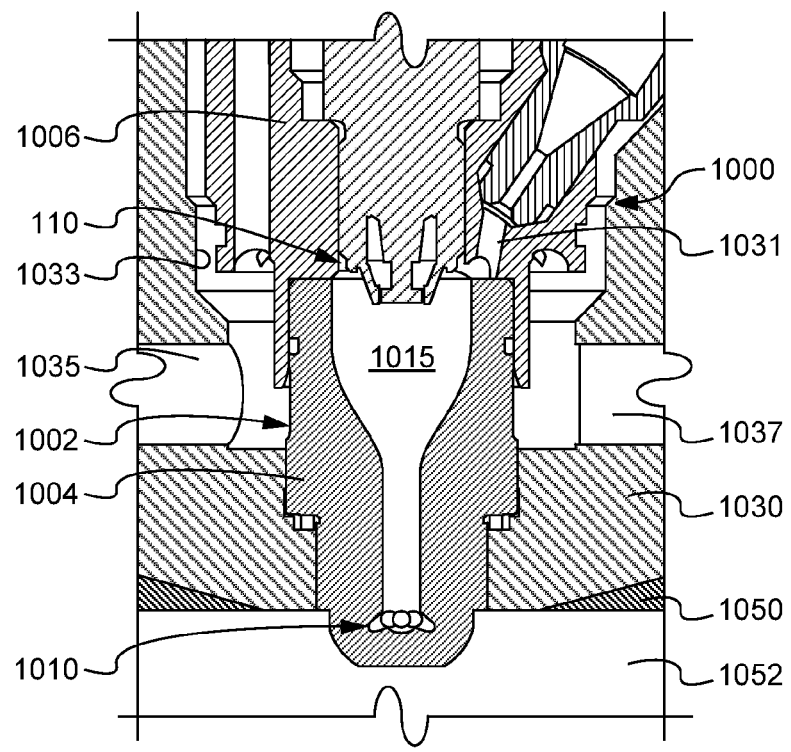
FIG. 12 is a cross-sectional side view of a fuel fed pre-chamber with a recessed spark plug according to one embodiment.

Referring to FIG. 12, according to one embodiment, a fuel fed pre-chamber apparatus 1000 is mounted directly to the cylinder head 1030 of an internal combustion engine. The cylinder head 1030 is associated with a conventional cylinder head with recesses 1033 designed to receive conventional spark plugs. The recesses 1033 are fluidly coupled to an air inlet 1035 and an exhaust outlet 1037. Instead of a conventional spark plug, the fuel fed pre-chamber apparatus is fitted within the spark plug recess 1033. As with the pre-chamber apparatus 900, the pre-chamber apparatus 1000 effectively spatially separates the spark plug (e.g., spark plug 110) from the main combustion chamber formed in the cylinder block 1050.

The fuel fed pre-chamber apparatus 1000 includes a body 1002 with a two-piece construction. A first section 1004 of the body 1002 defines the pre-chamber 1015 and the second section 1006 secures the spark plug 110 in place such that the cathode and anode electrodes are at least partially positioned within the pre-chamber. The first section 1004 of the body 1002 includes one or more orifices or nozzles 1010 that fluidly connect the pre-chamber 1015 with the main combustion chamber 1052 in the cylinder block 1050. The second section 1006 includes a fuel inlet 1031 in fuel providing communication with the pre-chamber 1015. Fuel from the fuel inlet 1031 and air from the air inlet 1035 mix within the pre-chamber 1015. Accordingly, the fuel fed pre-chamber apparatus 1000 differs from the passive pre-chamber 900 in that the air is mixed with fuel within the pre-chamber of the apparatus 1000 while the air is pre-mixed with fuel before entering the pre-chamber of the apparatus 900.

Figure 13:
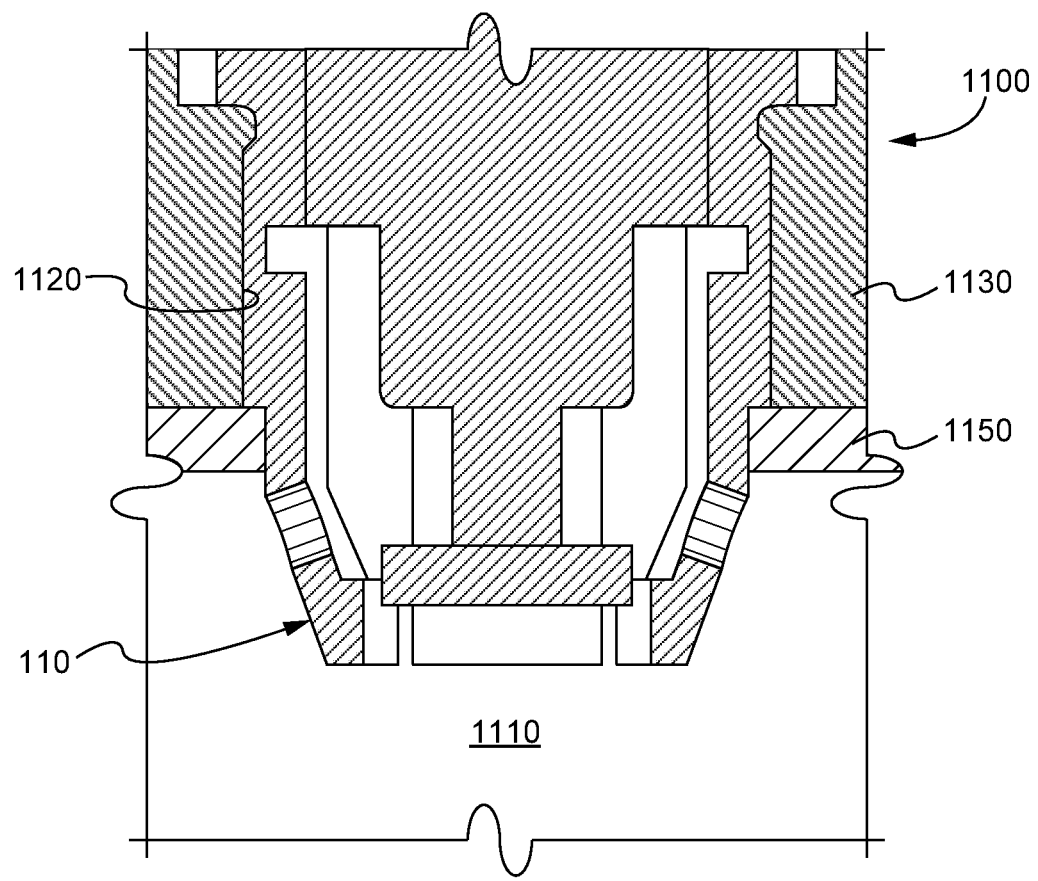
FIG. 13 is a cross-sectional side view of an open combustion chamber with a recessed spark plug according to one embodiment.

As shown in FIG. 13, according to one embodiment, a spark plug of the present disclosure (e.g., recessed spark plug 110) is shown fitted within an open chamber combustion system 1100. As shown, the recessed spark plug 110 is threadably engaged with a spark plug recess 1120 formed in the cylinder head 1130 of the system 1110. In contrast to the pre-chamber based combustion systems associated with FIGS. 11 and 12, the cathode and anode electrodes of the recessed spark plug 110 are positioned within the main combustion chamber 1110 of cylinder block 1150 of the engine. Accordingly, the spark generated by the recessed spark plug 110 initiates a combustion flame within the main combustion chamber 1110 as opposed to within a pre-chamber fluidly coupled to the main combustion chamber. Notwithstanding the lack of a pre-chamber in the open chamber combustion system 1100, the recessed spark plug 110 still is useful in facilitating a purge of residual exhaust gas within the electrode gaps of the spark plug such that efficient combustion within the main combustion chamber 1110 is achieved.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Understanding that the drawings submitted herewith depict only typical embodiments of the subject matter and are not therefore to be considered to be limiting of its scope, the subject matter will be described and explained with additional specificity and detail through the use of the drawings.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A spark plug for an internal combustion engine, comprising:
    a central electrode terminating at a first distal end surface defined about a central axis, the first distal end surface tapering inwardly from a point on the central axis;
    at least one outer electrode terminating at a second distal end surface, the at least one outer electrode at least partially laterally surrounding the central electrode such that the second distal end surface is radially offset relative to the central electrode and a lateral gap is defined between the central electrode and the at least one outer electrode; and
    a pad terminating at a third distal end surface, the pad coupled to the second distal end surface of the at least one outer electrode, the third distal end surface tapering inwardly towards the central axis,
    wherein the first distal end surface of the central electrode is axially recessed relative to the third distal end surface of the pad.

2. The spark plug of claim 1, wherein the spark plug comprises a plurality of outer electrodes.

3. The spark plug of claim 1, wherein the first distal end surface of the central electrode is recessed up to about one millimeter relative to the second distal end surface of the at least one outer electrode.

4. The spark plug of claim 1, wherein the central electrode comprises a cylindrical head that defines the first distal end surface, the central electrode further comprising a stem supporting the head relative to the at least one outer electrode such that the lateral gap is defined between the head of the central electrode and the at least one outer electrode.

5. A spark plug for an internal combustion engine, comprising:
    a central electrode terminating at a first distal end surface defined about a central axis, the first distal end surface tapering inwardly from a point on the central axis;
    at least one outer electrode terminating at a second distal end surface, the at least one outer electrode at least partially laterally surrounding the central electrode such that the second distal end surface is radially offset relative to the central electrode and a lateral gap is defined between the central electrode and the at least one outer electrode; and
    at least one pad coupled to the second distal end surface of the at least one outer electrode, wherein a third distal end surface of the at least one pad is axially extended relative to the first distal end surface of the central electrode, the third distal end surface tapering inwardly towards the central axis.

6. The spark plug of claim 5, wherein the spark plug comprises a plurality of outer electrodes and a plurality of pads, wherein each of the plurality of outer electrodes is coupled to a respective one of the plurality of pads.

7. The spark plug of claim 5, wherein spark plug comprises a plurality of outer electrodes and only two pads each coupled to a respective two of the plurality of outer electrodes.

8. The spark plug of claim 7, wherein the respective two of the plurality of outer electrodes with pads coupled thereto are adjacent each other.

9. The spark plug of claim 7, wherein the respective two of the plurality of outer electrodes with pads coupled thereto are on opposing sides of the at least one outer electrode.

10. The spark plug of claim 5, wherein the at least one outer electrode is made from a first material and the at least one pad is made from a second material different than the first material.

11. A spark plug for an internal combustion engine, comprising:
    a central electrode terminating at a first distal end surface defined about a central axis, the first distal end surface tapering inwardly from a point on the central axis, the central electrode comprising at least one elongate channel formed in the first distal end surface;
    at least one outer electrode terminating at a second distal end surface, the at least one outer electrode at least partially laterally surrounding the central electrode such that the second distal end surface is radially offset relative to the central electrode and a lateral gap is defined between the central electrode and the at least one outer electrode; and
    a pad terminating at a third distal end surface, the pad coupled to the second distal end surface of the at least one outer electrode, and the third distal end surface tapering inwardly towards the central axis,
    wherein the first distal end surface of the central electrode is axially recessed relative to the third distal end surface of the pad.

12. The spark plug of claim 11, wherein the central electrode comprises at least two elongate channels formed in the first distal end surface.

13. The spark plug of claim 12, wherein the at least two elongate channels extend diametrically across the first distal end surface perpendicularly relative to each other.

14. A spark plug for an internal combustion engine, comprising:
    a central electrode terminating at a first distal end surface defined about a central axis, the first distal end surface tapering inwardly from a point on the central axis, the central electrode comprising a plurality of notches formed in the first distal end surface about an outer periphery of the first distal end surface;
    at least one outer electrode terminating at a second distal end surface, the at least one outer electrode at least partially laterally surrounding the central electrode such that the second distal end surface is radially offset relative to the central electrode and a lateral gap is defined between the central electrode and the at least one outer electrode; and
    a pad terminating at a third distal end surface, the pad coupled to the second distal end surface of the at least one outer electrode, and the third distal end surface tapering inwardly towards the central axis, wherein the first distal end surface of the central electrode is axially recessed relative to the third distal end surface of the pad.

15. The spark plug of claim 14, wherein each of the plurality of notches are substantially wedge shaped.

16. The spark plug of claim 14, wherein the plurality of notches are spaced an equal distance apart from each other about the outer periphery of the first distal end surface.

17. A spark plug for an internal combustion engine, comprising:
   a central electrode terminating at a first distal end surface defined about a central axis; and
   at least one outer electrode terminating at a second distal end surface, the at least one outer electrode at least partially laterally surrounding the central electrode such that the second distal end surface is radially offset relative to the central electrode and a lateral gap is defined between the central electrode and the at least one outer electrode;
   wherein the first distal end surface of the central electrode tapers inwardly from a point on the central axis, the first distal end surface being axially recessed relative to the second distal end surface, and wherein the second distal end surface tapers inwardly towards the central axis.

18. The spark plug of claim 17, wherein the first distal end surface of the central electrode is tapered at an angle relative to the second distal end surface of the at least one outer electrode, and wherein the angle is between about 1-degree and about 25-degrees.

19. The spark plug of claim 17, wherein the second distal end surface of the at least one outer electrode is tapered.

20. The spark plug of claim 19, wherein the second distal end surface of the at least one outer electrode is tapered at an angle relative to the first distal end surface of the central electrode, and wherein the angle is between about 1-degree and about 25-degrees.

* * * * *